United States Patent
Aruga (10) Patent No.: US 10,399,116 B2
(45) Date of Patent: Sep. 3, 2019

(54) LAMINATE AND PRODUCTION PROCESS THEREOF

(71) Applicant: AGC Inc., Chiyoda-ku (JP)

(72) Inventor: Hiroshi Aruga, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 37 days.

(21) Appl. No.: 15/708,697

(22) Filed: Sep. 19, 2017

(65) Prior Publication Data

US 2018/0001343 A1    Jan. 4, 2018

Related U.S. Application Data

(63) Continuation of application No. PCT/JP2016/062152, filed on Apr. 15, 2016.

(30) Foreign Application Priority Data

Apr. 27, 2015 (JP) .................................. 2015-090132

(51) Int. Cl.
*B05D 5/06* (2006.01)
*B32B 27/30* (2006.01)
(Continued)

(52) U.S. Cl.
CPC .............. *B05D 5/06* (2013.01); *B05D 3/144* (2013.01); *B32B 27/20* (2013.01); *B32B 27/30* (2013.01);
(Continued)

(58) Field of Classification Search
CPC ................ A01G 9/1407; A01G 9/1438; C09D 127/12–127/20
See application file for complete search history.

(56) References Cited

U.S. PATENT DOCUMENTS

| 5,532,304 A * | 7/1996 | Miyazaki .............. C03C 17/009 524/261 |
| 2008/0087187 A1 * | 4/2008 | Maul ...................... C09C 1/644 106/14.44 |

FOREIGN PATENT DOCUMENTS

| JP | 62-164767 | 7/1987 |
| JP | 4-44841 | 2/1992 |

(Continued)

OTHER PUBLICATIONS

Machine translation of JP 2006-152061A (Year: 2006).*
International Search Report dated Jul. 12, 2016 in PCT/JP2016/062152, filed on Apr. 15, 2016.

*Primary Examiner* — Ramsey Zacharia
(74) *Attorney, Agent, or Firm* — Oblon, McClelland, Maier & Neustadt, L.L.P.

(57) ABSTRACT

To provide a laminate having characteristics of a fluorinated polymer film such as weather resistance and stain resistance, and having an increased solar reflectance by a light reflection layer, wherein the solar reflectance is less likely to decrease over a long period of time, and the light reflection layer is less likely to delaminate; and a production process thereof.

A laminate 1 comprising a substrate 10 containing a first fluorinated polymer, a light reflection layer 12 made of a non-curable resin composition containing a second fluorinated polymer and an aluminum pigment, and a protective layer 14 obtained by curing a curable resin composition containing a third fluorinated polymer having a crosslinkable group and a curing agent for curing the third fluorinated polymer, wherein the light reflection layer 12 is disposed between the substrate 10 and the protective layer 14, the light reflection layer 12 has a thickness of from 0.5 to 5 μm, and the protective layer 14 has a thickness of from 0.3 to 2 μm.

15 Claims, 1 Drawing Sheet

(51) Int. Cl.
  *C08J 7/04* (2006.01)
  *C09D 127/12* (2006.01)
  *C09D 127/14* (2006.01)
  *C09D 127/16* (2006.01)
  *C09D 127/18* (2006.01)
  *C09D 127/20* (2006.01)
  *B32B 27/20* (2006.01)
  *B05D 3/14* (2006.01)
  *A01G 9/14* (2006.01)
  *B05D 7/04* (2006.01)
  *B05D 7/00* (2006.01)
  *E04D 5/10* (2006.01)

(52) U.S. Cl.
  CPC ............ *C08J 7/042* (2013.01); *C09D 127/12* (2013.01); *C09D 127/14* (2013.01); *C09D 127/16* (2013.01); *C09D 127/18* (2013.01); *C09D 127/20* (2013.01); *A01G 9/1407* (2013.01); *B05D 7/04* (2013.01); *B05D 7/544* (2013.01); *B05D 2451/00* (2013.01); *C08J 2327/12* (2013.01); *C08J 2427/12* (2013.01); *E04D 5/10* (2013.01)

(56) References Cited

FOREIGN PATENT DOCUMENTS

| | | |
|---|---|---|
| JP | 11-165384 | 6/1999 |
| JP | 2006-152061 | 6/2006 |
| WO | WO 2015/152170 A1 | 10/2015 |

* cited by examiner

LAMINATE AND PRODUCTION PROCESS THEREOF

This application is a continuation of PCT Application No. PCT/JP2016/062152, filed on April 15, 2016, which is based upon and claims the benefit of priority from Japanese Patent Application No. 2015-090132 filed on Apr. 27, 2015. The contents of those applications are incorporated herein by reference in their entireties.

TECHNICAL FIELD

The present invention relates to a laminate having a light reflection layer, and a production process thereof.

BACKGROUND ART

A fluorinated polymer film, which is excellent in e.g. weather resistance, stain resistance, is used as a film material (such as a roofing material or an exterior wall material) for film structure buildings (such as sports facilities (such as a swimming pool, a gymnasium, a tennis court, a football ground and an athletics stadium), warehouses, halls, exhibition halls and horticultural facilities (such as a horticultural greenhouse and an agricultural greenhouse)). However, the fluorinated polymer film has a high solar transmittance, and accordingly when it is used as a film material for film structure buildings which receive solar light, the interior of the film structure buildings tends to be too bright or the inside temperature of the film structure buildings tends to be too high. Therefore, it is desired to increase the solar reflectance of the fluorinated polymer film.

As a fluorinated polymer film having an increased solar reflectance, proposed is e.g. a laminate having a light reflection layer provided on a part or whole of a substrate containing a fluorinated polymer, wherein the light reflection layer has a mass average molecular weight within a specific range and is made of a non-curable resin composition containing a fluorinated polymer having a specific functional group in a specific proportion and aluminum particles (Patent Document 1).

PRIOR ART DOCUMENTS

Patent Documents

Patent Document 1: JP-A-2006-152061

DISCLOSURE OF INVENTION

Technical Problem

A film material for film structure buildings is usually composed of two fluorinated polymer films, and air is charged into a space between the films thereby to form an air layer. In a case where the laminate of Patent Document 1 is used as such films, the light reflection layer is provided on the air layer side. Because if the light reflection layer containing aluminum particles is in contact with water, the aluminum particles will react with water, whereby the solar reflectance of the light reflection layer tends to decrease with time.

However, such a film material composed of two fluorinated polymer films requires a large amount of films, a system for charging air into a space between the two films, and a cost for maintaining the system. Therefore a film material made of a single fluorinated polymer film has been studied.

However, in a case where a film material for film structure buildings is made of a single fluorinated polymer film and the laminate of Patent Document 1 is used as the film, the light reflection layer is in contact with not only outside air but also water. Therefore, it is required to use a laminate having a light reflection layer according to which the solar reflectance is less likely to decrease over a long period of time even under atmosphere where the light reflection layer is in contact with water.

The present invention is to provide a laminate having characteristics of a fluorinated polymer film such as weather resistance and stain resistance, and also having an increased solar reflectance by a light reflection layer, wherein the solar reflectance is less likely to decrease over a long period of time, and the light reflection layer is less likely to delaminate; and a production process thereof.

Solution to Problem

The present invention provides a laminate and a production process thereof having the following constructions [1] to [15].

[1] A laminate comprising a substrate containing a first fluorinated polymer, a light reflection layer made of a non-curable resin composition containing a second fluorinated polymer and an aluminum pigment, and a protective layer obtained by curing a curable resin composition containing a third fluorinated polymer having a crosslinkable group and a curing agent for curing the third fluorinated polymer, wherein the light reflection layer is disposed between the substrate and the protective layer, the light reflection layer has a thickness of from 0.5 to 5 µm, and the protective layer has a thickness of from 0.3 to 2 µm.

[2] The laminate according to [1], wherein the first fluorinated polymer is a vinyl fluoride polymer, a vinylidene fluoride polymer, a vinylidene fluoride-hexafluoropropylene copolymer, a tetrafluoroethylene-hexafluoropropylene-vinylidene fluoride copolymer, a tetrafluoroethylene-propylene copolymer, a tetrafluoroethylene-vinylidene fluoride-propylene copolymer, an ethylene-tetrafluoroethylene copolymer, a hexafluoropropylene-tetrafluoroethylene copolymer, an ethylene-hexafluoropropylene-tetrafluoroethylene copolymer, a perfluoro(alkyl vinyl ether)-tetrafluoroethylene copolymer, a chlorotrifluoroethylene polymer or an ethylene-chlorotrifluoroethylene copolymer.

[3] The laminate according to [1] or [2], wherein the first fluorinated polymer is an ethylene-tetrafluoroethylene copolymer.

[4] The laminate according to any one of [1] to [3], wherein the surface of the substrate on the side being in contact with the light reflection layer, is subjected to corona discharge treatment.

[5] The laminate according to any one of [1] to [4], wherein the second fluorinated polymer is a copolymer having a tetrafluoroethylene unit, a hexafluoropropylene unit and a vinylidene fluoride unit, or a copolymer having a fluoroolefin unit and a monomer unit having a hydroxy group.

[6] The laminate according to [5], wherein the second fluorinated polymer is the copolymer having a fluoroolefin unit and a monomer unit having a hydroxy group, and the non-curable resin composition contains no curing agent for curing the copolymer.

[7] The laminate according to [5] or [6], wherein the second fluorinated polymer is a copolymer of a fluoroolefin which is tetrafluoroethylene or chlorotrifluoroethylene, a monomer having a hydroxy group which is a hydroxyalkyl vinyl ether, and at least one monomer selected from the group consisting of a cycloalkyl vinyl ether, an alkyl vinyl ether and a carboxylic acid vinyl ester.

[8] The laminate according to any one of [1] to [7], wherein the aluminum pigment is made of a composite having a part or whole of the surface of aluminum particles coated with at least one member selected from the group consisting of an acrylic resin and silica, wherein the total coating amount of the acrylic resin and silica is from 3 to 15 parts by mass per 100 parts by mass of the aluminum particles.

[9] The laminate according to any one of [1] to [8], wherein the crosslinkable group in the third fluorinated polymer is a hydroxy group, a carboxy group, an amide group or a glycidyl group.

[10] The laminate according to any one of [1] to [9], wherein the third fluorinated polymer is a copolymer having a fluoroolefin unit and a monomer unit having a hydroxy group.

[11] The laminate according to [10], wherein the copolymer is a copolymer of tetrafluoroethylene or chlorotrifluoroethylene, a hydroxyalkyl vinyl ether and at least one monomer selected from the group consisting of a cycloalkyl vinyl ether, an alkyl vinyl ether and a carboxylic acid vinyl ester.

[12] The laminate according to any one of [1] to [11], wherein the curing agent is at least one member selected from the group consisting of an isocyanate curing agent, a blocked isocyanate curing agent and an aminoplast curing agent.

[13] The laminate according to any one of [1] to [12], which is a film material for a film structure building.

[14] The laminate according to [13], wherein the film structure building is a building in which solar radiation is received by the film.

[15] A process for producing the laminate as defined in any one of [1] to [14], comprising coating at least a part of the surface of the substrate with a coating fluid containing the non-curable resin composition and a solvent, followed by drying to form the light reflection layer, and then coating at least the surface of the light reflection layer with a coating fluid containing the curable resin composition and a solvent, followed by drying and thereby curing the curable resin composition to form the protective layer.

Advantageous Effects of Invention

The laminate of the present invention is a laminate having characteristics of a fluorinated polymer film such as weather resistance and stain resistance, and having an increased solar reflectance by a light reflection layer, wherein the solar reflectance is less likely to decrease over a long period of time, and the light reflection layer is less likely to delaminate.

According to the process for producing a laminate of the present invention, it is possible to produce a laminate having characteristics of a fluorinated polymer film such as weather resistance and stain resistance, and having an increased solar reflectance by a light reflection layer, wherein the solar reflectance is less likely to decrease over a long period of time, and the light reflection layer is less likely to delaminate.

DESCRIPTION OF EMBODIMENTS

In this specification, the meanings of the following terms are as follows.

A "unit" means a moiety derived from a monomer, which is present in a polymer and which constitutes the polymer. Further, one having a structure of a certain unit chemically converted after polymer formation may also be referred to as a unit.

Hereinafter, as the case requires, a unit derived from an individual monomer may be called by a name having "unit" attached to the monomer name.

"Solar reflectance" is a value measured in accordance with JIS R3106:1998 (ISO 9050:1990) "Testing method on transmittance, reflectance and emittance of flat glasses and evaluation of solar heat gain coefficient".

"Total luminous transmittance" is a value measured in accordance with JIS K7375:2008 "Plastics-Determination of total luminous transmittance and reflectance".

Films and sheets are referred to as "films" regardless of the thickness.

An acrylate and a methacrylate is generically referred to as "a (meth)acrylate", and acrylamide and methacrylamide is generically referred to as (meth)acrylamide.

[Laminate]

The laminate of the present invention is a laminate comprising a substrate containing a first fluorinated polymer, a light reflection layer made of a non-curable resin composition containing a second fluorinated polymer and an aluminum pigment, and a protective layer obtained by curing a curable resin composition containing a third fluorinated polymer having a first crosslinkable group and a curing agent for curing the third fluorinated polymer, wherein the light reflection layer is disposed between the substrate and the protective layer.

Figure 1:
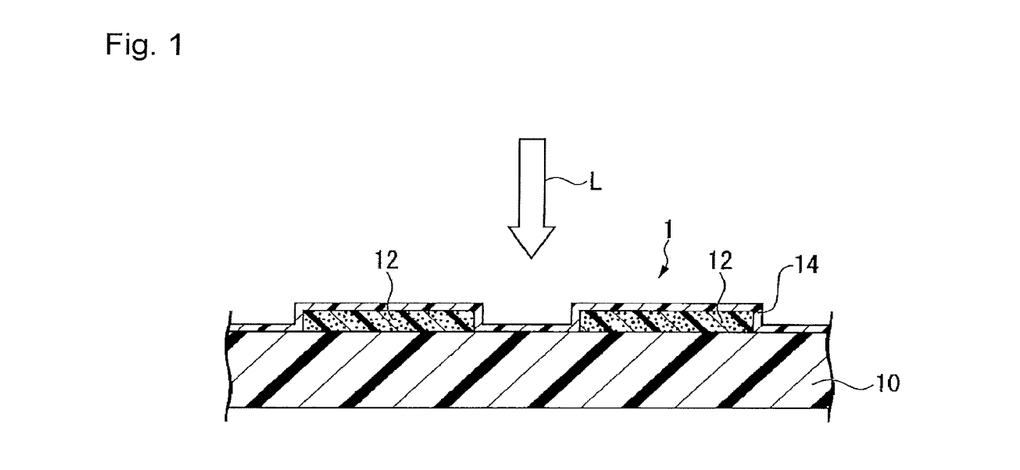
FIG. 1 is a schematic cross-sectional view illustrating one embodiment of the laminate of the present invention.

FIG. 1 is a schematic cross-sectional view illustrating one embodiment of the laminate of the present invention. A laminate 1 is so-called a top printing type laminate having a substrate 10, a light reflection layer 12 formed on a part of the surface of the substrate 10 on the side where solar light L enters, and a protective layer 14 covering the surface of the light reflection 12 and the surface of the substrate 10 on which no light reflection layer 12 is formed on the side where the solar light L enters.

Figure 2:
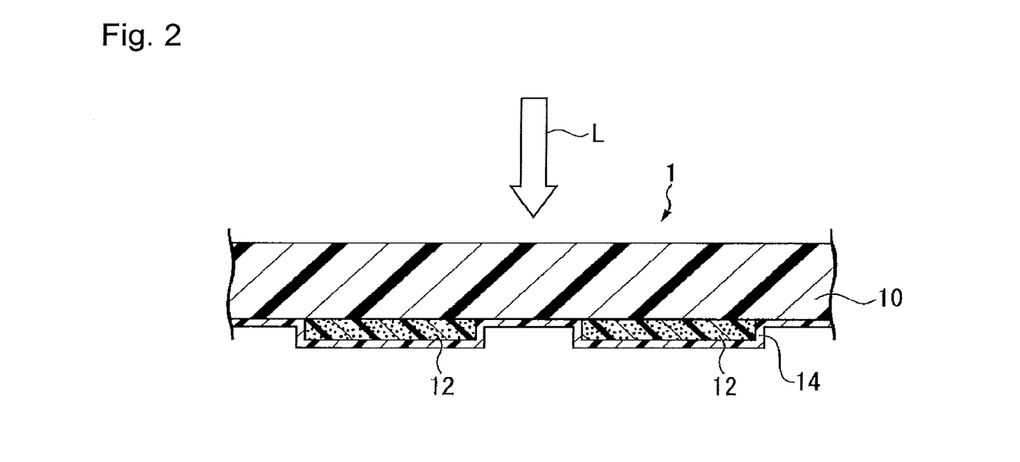
FIG. 2 is a schematic cross-sectional view illustrating another embodiment of the laminate of the present invention.

FIG. 2 is a cross-sectional view illustrating another embodiment of the laminate of the present invention. A laminate 1 is so-called a back printing type laminate having a substrate 10, a light reflection layer 12 formed on a part of the surface of the substrate 10 opposite to the side where the solar light L enters, and a protective layer 14 covering the surface of the light reflection layer 12 and the surface of the substrate 10 on which no light reflection layer 12 is formed opposite to the side where the solar light L enters.

(Fluorinated Polymer)

All of the first fluorinated polymer, the second fluorinated polymer and the third fluorinated polymer in the present invention are a polymer having a fluoroolefin unit. These fluorinated polymers may have a unit derived from a fluorinated monomer other than a fluoroolefin or a unit derived from a monomer having no fluorine atoms. Further, the fluorinated monomer other than a fluoroolefin or the monomer having no fluorine atoms may be a monomer having a cross linkable group or a polar group, and particularly, the third fluorinated polymer has a unit derived from a monomer having a crosslinkable group. The first fluorinated polymer preferably has no unit derived from a monomer having a crosslinkable group or a polar group.

The second fluorinated polymer may or may not have a unit derived from a monomer having a polar group. Further, in a case where the second fluorinated polymer has a polar group, the polar group may be the same type as or different type from the crosslinkable group in the third fluorinated polymer. The polar group in the second fluorinated polymer is preferably the same type as the crosslinkable group in the third fluorinated polymer. In particular, in a case where the second fluorinated polymer has a polar group, the second fluorinated polymer is preferably the same type as the third fluorinated polymer. Further, the polar group in the second fluorinated polymer is referred to as a crosslinkable group unless otherwise specified.

The fluoroolefin is preferably a fluoroolefin having at most 10 carbon atoms. As a specific example, vinyl fluoride, vinylidene fluoride, trifluoroethylene, chlorotrifluoroethylene (hereinafter referred to also as "CTFE"), tetrafluoroethylene (hereinafter referred to also as "TFE"), hexafluoropropylene, perfluorobutene-1, perfluorohexene-1, perfluorononene-1 or (perfluoroalkyl)ethylene may be mentioned.

Further, the (perfluoroalkyl)ethylene is a fluoroolefin represented by $CH_2=CH-R^f$ (wherein $R^f$ is a perfluoroalkyl group). As a specific example, (perfluoromethyl)ethylene or (perfluorobutyl)ethylene may be mentioned.

The fluoroolefin other than the (perfluoroalkyl)ethylene is preferably a $C_{2-3}$ fluoroolefin. The (perfluoroalkyl)ethylene is preferably a $C_{3-8}$ (perfluoroalkyl)ethylene.

The fluorinated monomer other than the fluoroolefin may, for example, be a perfluoro(alkyl vinyl ether) or a perfluoro unsaturated cyclic ether, and is preferably a perfluoro(alkyl vinyl ether).

The perfluoro(alkyl vinyl ether) is preferably a perfluoro (alkyl vinyl ether) having at most 10 carbon atoms, particularly preferably a perfluoro(alkyl vinyl ether) having at most 6 carbon atoms. As a specific example, perfluoro(methyl vinyl ether), perfluoro(ethyl vinyl ether), perfluoro(propyl vinyl ether) or perfluoro(heptyl vinyl ether) may be mentioned.

The crosslinkable group may, for example, be a hydroxy group, a carboxy group, an amide group or an epoxy group. The crosslinkable group is preferably a hydroxy group or a carboxy group. The monomer having a crosslinkable group may have at least two crosslinkable groups per molecule. Further, a fluorinated polymer having a crosslinkable group may have a unit derived from a monomer having at least two types of crosslinkable groups, and the unit may have different crosslinkable groups.

The monomer having a crosslinkable group is preferably a monomer having no fluorine atoms (hereinafter referred to also as "non-fluorine type monomer").

The monomer having a hydroxy group may, for example, be an allyl alcohol, a hydroxyalkyl vinyl ether, a hydroxyalkyl allyl ether, a hydroxyalkyl (meth)acrylate, a vinyl hydroxyalkylcarboxylate or an allyl hydroxyalkylcarboxylate. A hydroxyalkyl group in the above monomer having a hydroxyalkyl group, may be a hydroxycycloalkyl group or a hydroxyalkyl-substituted cycloalkyl group. The number of carbon atoms in the hydroxyalkyl group is preferably at most 10, particularly preferably at most 6.

The hydroxyalkyl vinyl ether may, for example, be 2-hydroxyethyl vinyl ether, 3-hydroxypropyl vinyl ether, 4-hydroxybutyl vinyl ether or 4-hydroxycyclohexyl vinyl ether.

The hydroxyalkyl allyl ether may, for example, be 2-hydroxyethyl allyl ether, 3-hydroxypropyl allyl ether, 4-hydroxybutyl allyl ether or 4-hydroxycyclohexyl alkyl ether.

The hydroxyalkyl (meth)acrylate may, for example, be 2-hydroxyethyl(meth)acrylate.

The vinyl hydroxyalkyl carboxylate may, for example, be vinyl hydroxyacetate, vinyl hydroxyisobutyrate, vinyl hydroxypropionate, vinyl hydroxybutyrate, vinyl hydroxyvalerate or vinyl hydroxycyclohexanecarboxylate.

The allyl hydroxyalkylcarboxylate may, for example, be allyl hydroxyacetate, allyl hydroxypropionate, allyl hydroxybutyrate, allyl hydroxyisobutyrate or allyl hydroxycyclohexanecarboxylate.

As a monomer having a carboxy group, acrylic acid or methacrylic acid may, for example, be mentioned.

The monomer having an amide group or an epoxy group, is preferably a compound having at most 10 carbon atoms.

The monomer having an amide group may, for example, be (meth)acrylamide or N-methyl (meth)acrylamide.

The monomer having an epoxy group may, for example, be glycidyl allyl ether or glycidyl (meth)acrylate.

The fluorinated polymer may have a unit derived from a non-fluorine type monomer having no crosslinkable group. In particular, the fluorinated polymer having a crosslinkable group preferably has a unit derived from a non-fluorine type monomer having no crosslinkable group.

The non-fluorine type monomer having no crosslinkable group may, for example, be an olefin, a vinyl ether, an allyl ether, a vinyl carboxylate, an allyl carboxylate or an unsaturated carboxylic acid ester. Except for an olefin, the number of carbon atoms of the monomer is preferably at most 16, particularly preferably at most 12.

The olefin is preferably a $C_{2-4}$ olefin, and may, for example, be ethylene, propylene or isobutylene.

The vinyl ether may be a cycloalkyl vinyl ether (such as cyclohexyl vinyl ether), an alkyl vinyl ether (such as nonyl vinyl ether, 2-ethylhexyl vinyl ether, hexyl vinyl ether, ethyl vinyl ether, n-butyl vinyl ether or tert-butyl vinyl ether).

The allyl ether may be an alkyl allyl ether (such as ethyl allyl ether or hexyl allyl ether).

The vinyl carboxylate may be a vinyl ester of a carboxylic acid (such as acetic acid, butyric acid, pivalic acid, benzoic acid or propionic acid). Further, as a vinyl ester of a carboxylic acid having a branched alkyl group, VeoVa 9 (registered trademark), VeoVa 10 (registered trademark) or the like manufactured by Shell Chemicals may be used.

The allyl carboxylate may, for example, be an allyl ester of a carboxylic acid (such as acetic acid, butyric acid, pivalic acid, benzoic acid or propionic acid).

The unsaturated carboxylic acid ester may, for example, be methyl (meth)acrylate, ethyl (meth)acrylate, n-propyl (meth)acrylate, isopropyl (meth)acrylate, n-butyl (meth) acrylate, isobutyl (meth)acrylate, tert-butyl (meth)acrylate, n-amyl (meth)acrylate, isoamyl (meth)acrylate, n-hexyl (meth)acrylate, isohexyl (meth)acrylate, 2-ethylhexyl (meth)acrylate or lauryl (meth)acrylate may, for example, be mentioned.

The second fluorinated polymer and the third fluorinated polymer, having a crosslinkable group, are preferably a copolymer of a fluoroolefin, a monomer having a crosslinkable group and a non-fluorine type monomer having no crosslinkable group. The fluoroolefin is preferably a $C_{2-3}$ fluoroolefin, particularly preferably TFE or CTFE. The monomer having a crosslinkable group is preferably a hydroxy group-containing monomer, particularly preferably a hydroxyalkyl vinyl ether. The non-fluorine type monomer having no crosslinkable group is preferably a cycloalkyl vinyl ether, an alkyl vinyl ether or a vinyl carboxylate. The fluorinated polymer may have at least two types of units derived from the non-fluorine type monomer having no crosslinkable group.

(Substrate)

It is preferred that the substrate has a light transparency so as not to impair the reflection performance by the light reflection layer. The total luminous transmittance of the substrate is preferably at least 70%, particularly preferably at least 85%.

The thickness of the substrate is preferably from 25 to 1,000 µm, particularly preferably from 100 to 500 µm. When the thickness of the substrate is at least the lower limit value in the above range, the mechanical strength of the substrate is excellent. When the thickness of the substrate is at most the upper limit value in the above range, the light transparency of the substrate is excellent.

The shape of the substrate is not particularly limited, but is preferably a film.

From the viewpoint of excellent adhesion to the light reflection layer and the protective layer, it is preferred that the surface where the light reflection layer and the protective layer are to be formed, is subjected to surface treatment, so as to increase the surface tension. By subjecting it to the surface treatment, a polar group (such as a formyl group, a carboxy group or a hydroxy group) is formed on the surface of the substrate, whereby a chemical bond is formed between the polar group on the surface of the substrate and the crosslinkable group of the second fluorinated polymer contained in the light reflection layer as the case requires or the crosslinkable group of the third fluorinated polymer contained in the protective layer, whereby the adhesion between the substrate and the light reflection layer or the protective layer improves.

The surface treatment may, for example, be corona discharge treatment, metal sodium treatment, mechanical roughening treatment or excimer laser treatment, and among them, corona discharge treatment is preferred because of high treatment speed and further no need of cleaning after the treatment.

The surface tension of the substrate is preferably at least 0.035 N/m, particularly preferably at least 0.04 N/m. When the surface tension of the substrate is at least the lower limit value in the above range, the adhesion between the substrate and the light reflection layer or the protective layer is further excellent.

The substrate contains the first fluorinated polymer.

The proportion of the first fluorinated polymer is preferably at least 60 mass %, more preferably at least 70 mass %, particularly preferably at least 90 mass %, in the substrate (100 mass %). When the proportion of the first fluorinated polymer is at least the lower limit value in the above range, the substrate is further excellent in weather resistance.

Further, the first fluorinated polymer in the substrate may be composed of only one type of a fluorinated polymer or at least two types of fluorinated polymers.

<First Fluorinated Polymer>

The fluorine atom content of the first fluorinated polymer is preferably at least 45 mass %, more preferably at least 50 mass %, particularly preferably at least 55 mass %. When the fluorine atom content is at least the lower limit value in the above range, the substrate will be further excellent in weather resistance, stain resistance, chemical resistance and non-tackiness, and particularly excellent in non-tackiness and stain resistance.

The first fluorinated polymer is not particularly limited so long as it may be formed into a film. The first fluorinated polymer is preferably a polymer having an excellent weather resistance and further having a stress to 10% elongation being at least 10 MPa. The value of the stress to 10% elongation is obtained by a method as stipulated in JIS K7127:1999 (Plastics-Determination of tensile properties—Part 3: Test conditions for films and sheets). Using dumbbell 5 as a test specimen, the tension at the time of elongation at a tensile speed of 200 mm/min is divided by a cross-sectional area of an original film. The stress to 10% elongation is not dependent on the thickness of the film but is greatly dependent on the composition of the fluorinated polymer. When the stress to 10% elongation is at least 10 MPa, the snow accumulation resistance and the wind pressure resistance are also excellent.

The first fluorinated polymer is preferably a homopolymer or copolymer of a fluoroolefin. Further, it is preferred that the first fluorinated polymer has no crosslinkable group, as mentioned above. The copolymer may be a copolymer of at least two types of fluoroolefins or a copolymer of at least one type of a fluoroolefin and at least one type of an olefin or a perfluoro(alkyl vinyl ether). The number of carbon atoms of a fluoroolefin and an olefin is preferably 2 or 3. The number of carbon atoms of a perfluoro(alkyl vinyl ether) is preferably from 3 to 6.

A preferred first fluorinated polymer may be a vinyl fluoride polymer (hereinafter referred to also as "PVF"), a vinylidene fluoride polymer (hereinafter referred to also as "PVDF"), a vinylidene fluoride-hexafluoropropylene copolymer, a tetrafluoroethylene-hexafluoropropylene-vinylidene fluoride copolymer (hereinafter referred to also as "THV"), a tetrafluoroethylene-propylene copolymer, a tetrafluoroethylene-vinylene fluoride-propylene copolymer, an ethylene-tetrafluoroethylene copolymer (hereinafter referred to also as "ETFE"), a hexafluoropropylene-tetrafluoroethylene copolymer (hereinafter referred to also as "FEP"), an ethylene-hexafluoropropylene-tetrafluoroethylene copolymer (hereinafter referred to also as "EFEP"), a perfluoro (alkyl vinyl ether)-tetrafluoroethylene copolymer (hereinafter referred to also as "PFA"), a chlorotrifluoroethylene polymer (hereinafter referred to also as "PCTFE") or an ethylene-chlorotrifluoroethylene copolymer (hereinafter referred to also as "ECTFE"). The first fluorinated polymer is particularly preferably ETFE.

<Other Components>

The substrate may contain other components (such as a non-fluorine type resin or a known additive) within a range not to impair the effect of the present invention. The known additive may be a coloring pigment represented by titanium oxide (white), aluminum cobalt oxide (blue) or iron oxide (red). As the substrate, one colored by the coloring pigment is sometimes used because the color of the substrate often represents an image of buildings such as film structure buildings.

(Light Reflection Layer)

A light reflection layer is a layer having reflection functions to solar light (ultraviolet ray, visible ray or near infrared ray) at a part or all area of the layer.

The solar reflectance of the light reflection layer may be properly determined according to e.g. applications of a laminate, and is not particularly limited.

The light reflection layer has a thickness of from 0.5 to 5 µm, preferably from 1 to 3 µm. When the light reflection layer has a thickness of at least the above lower limit value, the light reflection layer has an excellent solar reflectance. When the thickness of the light reflection layer is at most the above upper limit value, the light reflection layer can follow deformation (stretching or bending) of the substrate, whereby the light reflection layer hardly delaminates from the substrate.

The light reflection layer may be formed on a part or whole of the substrate. The light reflection layer may be formed on one surface or both surfaces of the substrate.

When the light reflection layer is formed on a part of the substrate, the light reflection layer is observed as a pattern. The pattern may, for example, be a letter, a round shape, an oval shape, a polygonal shape, a leaf or a tree.

A proportion of the area of the light reflection layer to the area on one surface of the substrate may properly be determined according to e.g. a purpose thereof, and may, for example, be from 10 to 100%.

From the viewpoint of excellent adhesion with the protective layer, the surface of the light reflection layer being in contact with the protective layer may be subjected to surface treatment so as to increase the surface tension.

The surface treatment may be the same surface treatment as for the substrate.

<Non-curable Resin Composition>

The light reflection layer is made of a non-curable resin composition containing a second fluorinated polymer and an aluminum pigment. The non-curable resin composition may also contain another component (such as a non-fluorine type resin or a known additive) within a range not to impair the effect of the present invention. The non-curable resin composition contains no curing agent nor curing catalyst.

<Second Fluorinated Polymer>

The second fluorinated polymer is a fluorinated polymer having no crosslinkable group or a fluorinated polymer having a crosslinkable group.

In a case where the second fluorinated polymer is a fluorinated polymer having no crosslinkable group, the second fluorinated polymer is preferably the same type as the first fluorinated polymer. However, as mentioned below, the light reflection layer is formed from a non-curable resin composition containing a solvent, therefore the second fluorinated polymer is a fluorinated polymer which is soluble in a solvent, and further the solvent is a solvent in which the first fluorinated polymer is insoluble. Accordingly, even when the second fluorinated polymer and the first fluorinated polymer are the same type of the fluorinated polymer, the combination of the second fluorinated polymer and the first fluorinated polymer is such that the second fluorinated polymer is one being soluble in a solvent and that the first fluorinated polymer is one being insoluble in the solvent.

Also in a case where the second fluorinated polymer is a fluorinated polymer having a crosslinkable group, the combination of the second fluorinated polymer and the first fluorinated polymer is the same as the above. However, the fluorinated polymer having a crosslinkable group, of which solubility in a solvent is much higher than the first fluorinated polymer such as the above ETFE, allows a general-purpose solvent to be used as a solvent for dissolving the second fluorinated polymer, and the first fluorinated polymer is usually insoluble in the general-purpose solvent. Further, some of THV have a high solubility depending on the unit composition. Therefore, it is preferred that the THV having a high solubility in a solvent is used as the second fluorinated polymer rather than as the first fluorinated polymer. Moreover, the protective layer is also in contact with the substrate in some cases, and therefore a solvent in which the first fluorinated polymer is insoluble, is also used as a solvent to be used for forming the protective layer.

As a specific example of the second fluorinated polymer having no crosslinkable group, PVF, PVDF, THV, ETFE, FEP, EFEP, PFA, PCTFE, ECTFE or a tetrafluoroethylene-2,2-bistrifluoromethyl-4,5-difluoro-1,3-dioxol copolymer may be mentioned. Among these fluorinated polymers, preferred is a fluorinated polymer which allows a solvent to be used for coating and which is highly soluble in a solvent, especially in a general-purpose solvent.

As the second fluorinated polymer having no crosslinkable group, THV is particularly preferred from the viewpoint that the solar reflectance of the light reflection layer is less likely to decrease over a long period of time, a solvent solubility is high, and the adhesion between the light reflection layer and the substrate or the protective layer is excellent.

In a case where the second fluorinated polymer is THV, the first fluorinated polymer is a fluorinated polymer other than THV as mentioned above, and is preferably ETFE.

Commercial products of THV may, for example, be THV (tradename) series (such as THV200, THV220, THV221, THV415 or THV500) (manufactured by 3M Company).

The second fluorinated polymer is preferably a fluorinated polymer having a crosslinkable group, more preferably a fluorinated polymer having a hydroxy group or a carboxy group, and particularly preferably a fluorinated polymer having a hydroxy group, with a view to further imparting other properties (such as solvent solubility, light transparency, gloss, hardness, flexibility or pigment dispersability).

As the fluorinated polymer having a hydroxy group, preferred is a copolymer of a monomer having a fluoroolefin and a hydroxy group with a non-fluorine type monomer having no crosslinkable group. Hereinafter, such a hydroxy group-containing fluorinated copolymer is referred to also as "copolymer (A)".

As a combination of monomers constituting the copolymer (A), the following combination (1) is preferred, and the combination (2) or (3) is particularly preferred from the viewpoint that the solar reflectance of the light reflection layer is less likely to decrease over a long period of time, the adhesion between the light reflection layer and the substrate or the protective layer is excellent, and the flexibility of the light reflection layer is excellent.

Combination (1)

Fluoroolefin: tetrafluoroethylene or chlorotrifluoroethylene

Monomer having hydroxy group: hydroxyalkyl vinyl ether

Another monomer: at least one member selected from the group consisting of cycloalkyl vinyl ether, alkyl vinyl ether and vinyl carboxylate Combination (2)

Fluoroolefin: tetrafluoroethylene

Monomer having hydroxy group: hydroxyalkyl vinyl ether

Another monomer: at least one member selected from the group consisting of tert-butyl vinyl ether and vinyl carboxylate Combination (3)

Fluoroolefin: chlorotrifluoroethylene

Monomer having hydroxy group: hydroxyalkyl vinyl ether

Another monomer: at least one member selected from the group consisting of tert-butyl vinyl ether and vinyl carboxylate A proportion of the fluoroolefin unit in the copolymer (A) is preferably from 30 to 70 mol %, particularly preferably from 40 to 60 mol % in all units (100 mol %) of the copolymer (A). When the proportion of the fluoroolefin unit is at least the lower limit value in the above range, the solar reflectance of the light reflection layer is less likely to decrease over a long period of time. When the proportion of the fluoroolefin unit is at most the upper limit value in the above range, the adhesion between the light reflection layer and the substrate or the protective layer is further excellent. Further, in a case where the copolymer (A) is used for a protective layer, the same properties as the above can be obtained by curing.

A proportion of the monomer unit having a hydroxy group in the copolymer (A) is preferably from 0.5 to 20 mol %, particularly preferably from 1 to 15 mol %, in all units (100 mol %) of the copolymer (A). When the proportion of the monomer unit having a hydroxy group is at least the lower limit value in the above range, the adhesion between the light reflection layer and the substrate or the protective layer is further excellent. When the proportion of the monomer unit having a hydroxy group is at most the upper limit value in the above range, the flexibility of the light reflection layer is excellent. Further, in a case where the copolymer (A) is used for the protective layer, the curability is excellent within the above range, and the physical properties such as adhesion or flexibility of a cured product are excellent.

A proportion of the non-fluorine type monomer unit having no crosslinkable group in the copolymer (A) is preferably from 20 to 60 mol %, particularly preferably from 30 to 50 mol %, in all units (100 mol %) of the copolymer (A). When the proportion of the monomer unit is at least the lower limit value in the above range, the flexibility of the light reflection layer is excellent. When the proportion of the monomer unit is at most the upper limit in the above range, the adhesion between the light reflection layer and the substrate or the protective layer is further excellent. Further, in a case where the copolymer (A) is used for the protective layer, the physical properties such as adhesion or flexibility of a cured product are excellent within the above range.

Commercial products of the copolymer (A) may, for example, be Lumiflon (registered trademark) series (such as LF200, LF100, LF710, etc.) (manufactured by Asahi Glass Company, Limited), ZEFFLE (registered trademark) GK Series (such as GK-500, GK-510, GK-550, GK-570, GK-580, etc.) (manufactured by Daikin Industries, Ltd.), FLUONATE (registered trademark) series (such as K-700, K-702, K-703, K-704, K-705, K-707, etc.) (manufactured by DIC Corporation), ETERFLON series (such as 4101, 41011, 4102, 41021, 4261A, 4262A, 42631, 4102A, 41041, 41111, 4261A, etc.) (manufactured by Eternal Chemical Co., Ltd.), etc.

<Aluminum Pigment>

An aluminum pigment is a pigment made of aluminum particles (such as aluminum flakes) or surface treated aluminum particles (such as aluminum particles having the surface covered with an organic or inorganic material). In the surface treated aluminum particles, the organic material may, for example, be a resin, an aliphatic acid or a silane coupling agent, and the inorganic material may, for example, be an inorganic oxide such as silica or a metal other than aluminum.

The aluminum pigment in the light reflection layer is preferably aluminum particles (such as aluminum flakes) alone or aluminum particles having the surface covered with at least one member selected from the group consisting of an acrylic resin and silica, and a pigment made of aluminum particles covered with an acrylic resin or silica is particularly preferred, from the viewpoint that the solar reflectance of the light reflection layer is less likely to decrease over a long period of time.

The total coating amount of the acrylic resin and silica is preferably from 3 to 30 parts by mass, more preferably from 3 to 15 parts by mass, furthermore preferably from 4 to 12 parts by mass, particularly preferably from 6 to 10 parts by mass, based on 100 parts by mass of the aluminum particles. When the total coating amount of the acrylic resin and silica is at least the lower limit value in the above range, the aluminum particles are sufficiently protected by the acrylic resin or silica, whereby the solar reflectance of the light reflection layer is less likely to decrease over a long period of time. When the total coating amount of the acrylic resin and silica is at most the upper limit value in the above range, the solar reflectance of the light reflection layer is less likely to decrease over a long period of time from the following reasons. If the coating amount of the acrylic resin is too large, the aluminum particles tend to be dissolved due to deterioration of the acrylic resin, whereby the solar reflectance of the light reflection layer is likely to decrease. If the coating amount of silica is too large, cracking tends to occur in the inside of silica during a weather resistance test, whereby aluminum tends to be dissolved by moisture penetrated and the solar reflectance of the light reflection layer tends to decrease.

The coating amount of the resin such as an acrylic resin is obtained in such a manner that the aluminum pigment is mixed with a mixed acid thereby to dissolve aluminum, and then a resin which is insoluble in the mixed acid, is collected by filtration and its mass is measured.

The coating amount of the inorganic material such as silica is obtained from a ratio of an atom in the inorganic material such as silicon atoms to aluminum atoms obtained by analyzing the solution having the aluminum pigment dissolved in the mixed acid by means of an inductively coupled plasma emission spectrometer (ICP).

The water surface diffusion area of the aluminum pigment is preferably from 14,000 to 27,000 $cm^2/g$, more preferably from 16,000 to 24,000 $cm^2/g$, particularly preferably from 16,000 to 20,000 $cm^2/g$. When the water surface diffusion area of the aluminum pigment is at least the lower limit value in the above range, the initial solar reflectance of the light reflection layer is excellent. When the water surface diffusion area of the aluminum pigment is at most the upper limit value in the above range, the solar reflectance of the light reflection layer is less likely to decrease over a long period of time.

The water surface diffusion area of the aluminum pigment is measured in accordance with JIS K5906:1996 (ISO 1247: 1974/A1-1982) "Aluminum pigments for paints". Here, in the method for measuring the water surface diffusion area of aluminum pigments for paints as described in JIS, a leafing type aluminum pigment is employed. In the case of a non-leafing type aluminum pigment, the following treatment is carried out in advance of the measurement of the water surface diffusion area. To the aluminum pigment, stearic acid is added in an equivalent amount, and a mineral spirit as industrial gasoline for coating material or xylol is added in an amount of 10 times, followed by heating to a temperature of at least 60° C. on a sand bath, to cover the surface of the aluminum pigment with stearic acid. The resultant was dried to obtain a powder of the aluminum pigment, followed by measuring the water surface diffusion area.

The aluminum pigment having the surface of aluminum particles covered with an acrylic resin may be produced, for example, by polymerizing a (meth)acrylic monomer on the surface of aluminum particles (e.g. JP-A-2001-329226, JP-A-58-141248, etc.).

The aluminum pigment having the surface of aluminum particles covered with silica may be produced, for example, by hydrolyzing a silicon alkoxide or the like on the surface of aluminum particles (e.g. JP-A-2002-88274, etc.).

As the aluminum pigment, a commercial product may be used.

As the aluminum pigment, one type may be used alone, or at least two types may be used in combination.

<Other Components>

As other components, a non-fluorine type resin or a known additive may, for example, be mentioned.

As the non-fluorine type resin, a polyester resin, an acrylic resin or an epoxy resin may, for example, be mentioned.

The additive may, for example, be an antifoaming agent, a matting material (such as silica or alumina), a tack modifier (such as polyolefin), an agent for improving adhesion to the substrate or the protective layer (such as a silane coupling agent), or other pigments.

<Proportion of Each Component in Non-curable Resin Composition>

The proportion of the second fluorinated polymer is preferably from 90 to 65 mass %, particularly preferably from 80 to 65 mass %, in the non-curable resin composition (100 mass %). When the proportion of the second fluorinated polymer is at least the above lower limit value, the light reflection layer is further excellent in weather resistance. When the proportion of the second fluorinated polymer is at most the above upper limit value, the light reflection layer is excellent in hiding properties and solar reflectance.

The proportion of the aluminum pigment is preferably from 10 to 35 mass %, particularly preferably from 20 to 35 mass %, in the non-curable resin composition (100 mass %). When the proportion of the aluminum pigment is at least the lower limit value in the above range, the light reflection layer is excellent in hiding properties and solar reflectance. When the proportion of the aluminum pigment is at most the upper limit value in the above range, the viscosity of the after-mentioned first coating fluid tends to be low, whereby the light reflection layer is easily formed. Further, the adhesion between the light reflection layer and the substrate or the protective layer is further excellent.

The proportion of other components is preferably from 0 to 25 mass %, in the non-curable resin composition (100 mass %).

Here, no solvent is contained in the non-curable resin composition. A non-curable resin composition containing a solvent is distinguished as the after-mentioned coating fluid.

(Protective Layer)

A protective layer is a layer for suppressing lowering of the solar reflectance of the light reflection layer over a long period of time and further suppressing delamination of the light reflection layer, by chemically and physically protecting the light reflection layer.

It is preferred that a protective layer has a light transparency, in order not to impair the reflection function by the light reflection layer. The total luminous transmittance of the protective layer is preferably at least 70%, particularly preferably at least 85%.

The protective layer has a thickness of from 0.3 to 2 μm, preferably from 0.5 to 1 μm. When the thickness of the protective layer is at least the lower limit value in the above range, it is possible to chemically and physically protect the light reflection layer. As a result, it is possible to suppress permeation of water into the light reflection layer and abrasion of the light reflection layer. When the thickness of the protective layer is at most the upper limit value in the above range, the light reflection layer is less likely to delaminate from the substrate due to the after-mentioned mechanism of action. Further, when the thickness of the protective layer is at most the upper limit value in the above range, combustion heat is small, and it is therefore possible to maintain flame retardancy (quality of being hard to spread fire) as a film material in a film structure building.

The protective layer may be formed on only the light reflection layer, or formed on the light reflection layer and the substrate. For example, the proportion of the light reflection layer area to the substrate area may be 50%, and the proportion of the protective layer area to the substrate area may be 100%.

<Curable Resin Composition>

The protective layer is a cured resin layer obtained by curing a curable resin composition containing a third fluorinated polymer having a crosslinkable group and a curing agent for curing the third fluorinated polymer. The curable resin composition may contain a curing catalyst. The curable resin composition may contain other components (such as a curing catalyst, a non-fluorine type resin or a known additive) within a range not to impair the effect of the present invention.

The curing resin layer is insoluble within 10 hours at the time of applying ultrasonic waves while dipping it in acetone or toluene. On the other hand, the above-mentioned light reflection layer, which is made of a non-curable resin composition, is completely dissolved under such conditions, and therefore these layers are different. Further, in infrared analysis of the cured resin layer, if an isocyanate curing agent is used as a curing agent, a peak of a bond (such as an urethane bond) formed by a reaction of its isocyanate group is observed.

<Third Fluorinated Polymer>

The third fluorinated polymer is a fluorinated polymer having a crosslinkable group.

The third fluorinated polymer is preferably a fluorinated polymer having the same type of unit as in the second fluorinated polymer having a crosslinkable group, in view of adhesion between the light reflection layer and the protective layer. Further, even when the third fluorinated polymer is a fluorinated polymer not having the same type of unit as the second fluorinated polymer having a crosslinkable group, it is possible to secure the adhesion between the light reflection layer and the protective layer, by applying surface treatment to the light reflection layer or providing the after-mentioned adhesive layer between the light reflection layer and the protective layer.

The third fluorinated polymer is preferably the above copolymer (A), from the viewpoint that the protective layer can sufficiently develop the after-mentioned mechanism of action.

<Curing Agent>

A curing agent is a compound for curing the third fluorinated polymer by reacting with a crosslinkable group of the third fluorinated polymer. The curing agent has at least two reactive groups being reactive with the crosslinkable group. Such a reactive group being reactive with the crosslinkable group may be a reactive group which is activated at e.g. a reaction temperature at the time of curing the third fluorinated polymer.

The reactive group may, for example, be an isocyanate group, an amino group, a carboxy group or an epoxy group.

As the reactive group which is activated during the curing, a blocked isocyanate group may, for example, be mentioned.

The curing agent may suitably be selected from a known curing agent depending on e.g. a type of the crosslinkable group of the third fluorinated polymer.

The curing agent may, for example, be an isocyanate curing agent, a blocked isocyanate curing agent, an aminoplast curing agent, a polyvalent carboxylic acid curing agent or a polyvalent amine curing agent. The curing agent for curing a fluorinated polymer having a hydroxy group is preferably at least one member selected from the group consisting of an isocyanate curing agent, a blocked isocyanate curing agent and an aminoplast curing agent.

In a case where there is a risk of curing in the coexistence of the third fluorinated polymer and the curing agent before curing the curable composition, it is preferred to use a curing agent having a reactive group which is activated during curing, such as a blocked isocyanate curing agent.

The curable resin composition may be formed immediately before forming the protective layer. For example, two-liquid type coating fluid composed of a main agent containing the third fluorinated polymer but containing no curing agent and an aid agent containing a curing agent, is used as the after-mentioned coating fluid, and such two liquids are mixed immediately before forming the protective layer, to form a curable resin composition containing a solvent.

A curing agent suitable for such a two-liquid type coating fluid is preferably a curing agent which undergoes a curing reaction at normal temperature (25° C.), and a non-yellowing diisocyanate (diisocyanate having no isocyanate group directly bonded to an aromatic nucleus, such as hexamethylene diisocyanate or isophorone diisocyanate), an adduct or an oligomer of such a non-yellowing diisocyanate may, for example, be mentioned.

As the curing agent, one type may be used alone, or at least two types may be used in combination.

<Curing Catalyst, Other Components>

The curable resin composition may further contain a curing catalyst such as dibutyltin dilaurate in addition to the curing agent. As the curing catalyst, one type may be used alone, or at least two types may be used in combination.

Other components may be the same as other components in the non-curable resin composition.

<Proportion of Each Component in Curable Resin Composition>

The proportion of the curing agent is preferably from 1 to 20 parts by mass, particularly preferably from 2 to 10 parts by mass, based on 100 parts by mass of the third fluorinated polymer. When the proportion of the curing agent is at least the lower limit value in the above range, the curability of the curable resin composition is excellent. Further, the adhesion between the substrate or the light reflection layer and the protective layer is further excellent. When the proportion of the curing agent is at most the upper limit value in the above range, the weather resistance of the protective layer is further excellent.

In a case where a curing catalyst is contained, the proportion of the curing catalyst is preferably from 0.05 to 2 parts by mass, particularly preferably from 0.1 to 1 part by mass, based on 100 parts by mass of the third fluorinated polymer.

The proportion of such other components is preferably from 0 to 25 mass %, in the curable resin composition (100 mass %).

Further, the curable resin composition contains no solvent. A curable resin composition containing a solvent is distinguished as the after-mentioned coating fluid.

(Other Layer)

The laminate of the present invention may have an adhesive layer between the substrate and the light reflection layer, between the substrate and the protective layer or between the light reflection layer and the protective layer. The adhesive layer may, for example, be a layer formed by applying a silane coupling agent.

The laminate of the present invention may have a printing layer containing a pigment other than the aluminum pigment, for imparting e.g. design properties. It is preferred that the printing layer is disposed between the substrate and the protective layer, in view of weather resistance of the printing layer.

(Property of Laminate)

The solar reflectance of the laminate of the present invention may suitably be determined depending on e.g. applications of the laminate, and is not particularly limited. The solar reflectance of the laminate of the present invention is usually from 20 to 80%, preferably from 30 to 70%.

(Production Process of Laminate)

The laminate of the present invention may, for example, be produced by forming a light reflection layer on the surface of a substrate, and then forming a protective layer on at least the surface of the light reflection layer.

<Production of Substrate>

The substrate may be produced by a known production method (such as extrusion, calendaring or solution casting) of a film.

It is preferred that the substrate is subjected to the above-mentioned surface treatment.

<Formation of Light Reflection Layer>

A method for forming the light reflection layer may, for example, be the following method.

A method for forming the light reflection layer by coating the substrate with a coating fluid containing the non-curable resin composition and a solvent by means of a known printing method (such as gravure printing, screen printing (silk printing), pad printing or inkjeting), followed by drying.

A method for forming the light reflection layer by coating the substrate with a coating fluid containing the non-curable resin composition and a solvent by means of a known coating method (such as brush coating, spray coating or die coating), followed by drying.

A method for forming the light reflection layer on a transfer film by means of a known printing method or coating method, and transferring the light reflection layer on the transfer film onto the substrate by e.g. a heated roll.

The method for forming the light reflection layer is preferably a printing method, particularly preferably a printing method by means of gravure printing, in view of positioning accuracy or excellent productivity.

The solvent is one which can dissolve the second fluorinated polymer, and may suitably be selected depending on the printing method or the coating method, in consideration of e.g. repellency of the coating fluid on the substrate, the transfer rate, the drying properties and the storage stability. For example, in the gravure printing, the solvent is preferably such that the Zahn cup No.3 viscosity of the coating fluid would be from 15 to 30 seconds, in order to reduce printing defects such as uneven coating, blurring, etc. Further, the solvent is preferably such that the surface of a surface-treated substrate can be easily wetted, and the boiling point is not so high. In a case where the second fluorinated polymer is a fluorinated polymer having a high solubility in a general-purpose solvent, such as a copolymer (A), it is possible to use the general-purpose solvent, preferably toluene, xylene, methyl ethyl ketone or a mixed solvent containing them.

The light reflection layer is formed by forming a coating film of the coating fluid, and then drying for removing the solvent. The drying method may, for example, be drying under heating, drying under reduced pressure or drying under heating and reduced pressure. In the case of the drying under heating or the drying under heating and reduced pressure, a heating temperature is preferably from 30 to 150° C., particularly preferably from 60 to 120° C. The drying may be carried out only one time or a plurality of times.

<Formation of Protective Layer>

The protective layer is formed by using a coating fluid containing the curable resin composition and a solvent, applying the coating fluid on the surface of the light reflection layer or the surfaces of the light reflection layer and the substrate to form a coating film, followed by drying thereby to cure the curable resin composition. It is possible to form the protective layer in the same manner as the formation of the light reflection layer, except for curing, and the same also applies to a preferred embodiment. Further, it is possible to form the protective layer in the same way by using a two-liquid type coating fluid as the above.

It is possible to cure the curable resin composition by means of curing under heating or curing at normal temperature, depending on the type of the curing agent, and it is possible to carry out the curing by drying at a drying temperature in the formation of the light reflection layer. Further, it is possible to carry out drying at a relatively low temperature and then curing at a higher temperature than the drying temperature.

(Mechanism of Action)

The laminate of the present invention as described above, has essential requirements such that (i) the substrate contains a first fluorinated polymer, (ii) the light reflection layer is one made of a non-curable resin composition containing a second fluorinated polymer and an aluminum pigment, (iii) the protective layer is one obtained by curing a curable resin composition containing a third fluorinated polymer and a curing agent, (iv) the light reflection layer is disposed between the substrate and the protective layer, (v) the light reflection layer has a thickness of from 0.5 to 5 µm, and (vi) the protective layer has a thickness of from 0.3 to 2 µm. Further, by integrating the requirements (i) to (vi), it is possible to exhibit effects that the laminate has properties as a fluorinated polymer film such as weather resistance and stain resistance, the initial solar reflectance is excellent, the solar reflectance is less likely to decrease over a long period of time, and further the light reflection layer is less likely to delaminate, as described in the following (1) to (4).

(1) The substrate, the light reflection layer and the protective layer respectively contain fluorinated polymers, and therefore the laminate itself has properties as a fluorinated polymer film, such as weather resistance or stain resistance.

(2) The light reflection layer contains an aluminum pigment and further has a thickness of at least 0.5 µm, and therefore the initial solar reflectance is excellent.

(3) The protective layer is one obtained by curing a curable resin composition, the protective layer has a thickness of at least 0.3 µm, and the light reflection layer is disposed between the substrate and the protective layer, and therefore the solar reflectance is less likely to decrease over a long period of time. Now, this reason will be described in detail.

The light reflection layer is considered to contain e.g. fluorine ions or hydrogen fluoride formed by light or heat at the time of e.g. surface treatment of the substrate, production of the second fluorinated polymer and the formation of the light reflection layer. If e.g. the fluorine ions or hydrogen fluoride is in contact with water, an acid is produced and aluminum in the aluminum pigment is dissolved therein, and therefore the solar reflectance of the light reflection layer decreases with time. It is impossible to sufficiently suppress the dissolution of aluminum by merely coating the surface of aluminum particles with e.g. an acrylic resin or silica. Accordingly, in order to suppress dissolution of aluminum, it is important to suppress permeation of moisture into the light reflection layer by the substrate and the protective layer. Further, in order to suppress the permeation of moisture into the light reflection layer, the above requirements are needed.

That is, the protective layer obtained by curing a curable resin composition containing a fluorinated polymer is excellent in water resistance. Further, the protective layer, which has no tackiness (stickiness) even if the temperature is increased by exposing it to solar light, is less likely to adsorb e.g. dust or sand. Further, the substrate containing the fluorinated polymer is also excellent in weather resistance, and is also less likely to adsorb e.g. dust or sand. If the laminate adsorbs e.g. dust or sand, the dust or sand may absorb moisture, and the moisture is easily penetrated into the light reflection layer. By disposing the light reflection layer between the protective layer and the substrate each having excellent water resistance and being less likely to absorb e.g. dust or sand, and further by adjusting the thickness of the protective layer to at least 0.3 µm, it is possible to suppress penetration of moisture into the light reflection layer.

Further, according to the substrate and the protective layer, it is possible to suppress abrasion of the light reflection layer due to rubbing between the light reflection layer and e.g. a metal member in an operation of increasing the width by heat welding of laminates or an operation of fixing a laminate to a frame, or abrasion of the light reflection layer due to e.g. sand when the laminate is placed outside.

As mentioned above, by suppressing permeation of moisture into the light reflection layer and abrasion of the light reflection layer, the solar reflectance of the light reflection layer is less likely to decrease over a long period of time.

(4) The light reflection layer is one made of a non-curable resin composition, the light reflection layer has a thickness of at most 5 µm, and further the protective layer has a thickness of at most 2 µm, whereby the light reflection layer is less likely to delaminate. Now, this reason will be described in detail.

The light reflection layer made of a non-curable resin composition containing no curing agent can follow deformation (stretching or bending) of the substrate by cohesion failure of a non-cured fluorinated polymer. Accordingly, the non-cured light reflection layer having a thickness of at most 5 µm is excellent in flowability to deformation of the substrate and is less likely to delaminate from the substrate, in a state where the light reflection layer does not adhere to the protective layer.

On the other hand, the protective layer obtained by curing a curable resin composition is such that such a cured product is free from cohesion failure, and therefore when the protective layer is thick, the protective layer cannot follow deformation of the substrate. In the case of a film material for a building installed outside, the thickness of the protective layer formed on the light reflection layer is usually a few tens μm. When the protective layer in the laminate as a film material has such a usual thickness, the cohesion of such a non-cured light reflection layer is also increased by the influence of the protective layer, although the reason is unclear. Accordingly, the light reflection layer attached to the protective layer is also free from the cohesion failure, and therefore the light reflection layer cannot follow deformation of the substrate. Therefore, interfacial adhesion failure between the substrate and the light reflection layer occurs, and interfacial delamination between the substrate and the light reflection layer occurs.

The interfacial delamination between the substrate and the light reflection layer is remarkable in an accelerated weathering test by means of back exposure in which light enters from the substrate side and water is sprayed to the substrate side. After a long-term accelerated weathering test is carried out by means of back exposure, a cellophane-tape peeling test is carried out, whereby the interfacial delamination occurs between the substrate and the light reflection layer in a case where the protective layer has a thickness of at least 3 μm. This reason is as follows. Deterioration of the light reflection layer by top exposure in which light enters from the protective layer side and water is sprayed to the protective layer side, starts from the interface between the protective layer and the light reflection layer. When aluminum in the light reflection layer is dissolved by penetration of water, it may flow down by the water continuously supplied from outside, whereby the light reflection layer tends to be brittle. Accordingly, in the case of top exposure, it is considered that lowering of the solar reflectance by the chemical change of aluminum is observed at an earlier stage, and at the same time, the cohesion failure of the light reflection layer is considered to occur in the cellophane-tape peeling test. On the other hand, in the case of back exposure, water never penetrates into the light reflection layer, and it is therefore considered that the dissolution of aluminum is less likely to occur as compared with the top exposure in which water penetrates. However, light strikes the interface between the substrate and the light reflection layer, and therefore in addition to the deterioration such as cracking of the light reflection layer, the adhesion of the interface is deteriorated, whereby delamination occurs at the interface between the substrate and the light reflection layer.

It is necessary to consider a long-term back exposure in application specific to a film material having a transparent substrate. In the case of a building member in which a substrate is an opaque metal, cement or the like, the light reflection layer is not subjected to back exposure, and therefore it is necessary to consider only the top exposure in which light enters from the protective layer side. In the present invention, the thickness of the protective layer is stipulated considering the application specific to the film material having a transparent substrate. The interfacial delamination between the substrate and the light reflection layer implies the loss of all of reflection functions, and therefore it is extremely necessary to avoid the interfacial delamination.

As mentioned above, the larger the thickness of the protective layer becomes, the more the interfacial delamination between the substrate and the light reflection layer occurs due to deformation of the substrate and the back exposure. In the present invention, when the thickness of the protective layer is at most 2 μm, it is possible to suppress increase of the cohesion of the non-cured light reflection layer by the protecting layer, and it is possible to suppress interfacial delamination between the substrate and the light reflection layer.

Further, a cured product of the curable resin composition has a high initial adhesion, but is easily deteriorated by the solar light, and therefore the adhesion is deteriorated with time. On the other hand, in the case of the non-cured light reflection layer, the adhesion with the substrate is less likely to deteriorate with time. Also from this point of view, it is possible to suppress interfacial delamination between the substrate and the light reflection layer. Further, in the case of a protective layer made of a cured product of the curable resin composition, the adhesion to the substrate deteriorates with time, and the protective layer thereby delaminates from the substrate, but the adhesion with the light reflection layer is high, and therefore the protective layer remains on the light reflection layer over a long period of time. Accordingly, it is possible to suppress penetration of moisture into the light reflection layer and abrasion of the light reflection layer over a long period of time, by the protective layer.

EXAMPLES

Now, the present invention will be described in detail with reference to Examples. However, the present invention is not limited by the following description.

Ex. 3 to 5, 7, 9 to 13 and 15 are Examples of the present invention, and Ex. 1, 2, 6, 8 and 14 are Comparative Examples.

Evaluation methods in Examples and Comparative Examples are as follows.

[Evaluation Methods]
(Adhesion of Light Reflection Layer)

A cellophane tape (CT18, manufactured by Nichiban Co., Ltd.) was bonded to a light reflection layer or a protective layer, and the cellophane tape was peeled five times, whereupon the state of the light reflection layer was visually observed and evaluated by the following standards.

A (good): delamination of the light reflection layer was less than 20%.

B (acceptable): delamination of the light reflection layer was at least 20% and less than 50%.

C (poor): delamination of the light reflection layer was at least 50%.

(Solar Reflectance)

The solar reflectance of a laminate was measured by using a spectrophotometer (UV-3100PC, manufactured by Shimadzu Corporation) in accordance with JIS R3106:1998 (ISO 9050:1990) "Testing method on transmittance, reflectance and emittance of flat glasses and evaluation of solar heat gain coefficient". The solar reflectance was measured by applying light from the substrate side.

(80° C. Hot Bath Steam Condensation Test)

In a room maintained at 23° C., a hot bath with temperature regulator, filled with water, was prepared. Above the hot bath, a laminate was disposed at an inclination angle of 21 degrees and so that the light reflection layer or the protective layer would face downward, thereby to form a closed space consisting of the hot bath and the laminate. And the water temperature of the hot bath was kept at 80° C. Steam produced from the hot bath, when in contact with the laminate, is chilled and condensed. The resulting condensed water flows down to the hot bath of 80° C. from the laminate. This 80° C. hot bath steam condensation test was carried out for ten days. The solar reflectance after the test was measured to obtain the solar reflectance retention (=solar reflectance after test/solar reflectance before test×100). The solar reflectance retention was regarded as "poor" when it was less than 70%, "acceptable" when it was at least 70%, and "good" when it was at least 80%.

(Accelerated Weathering Test)

An accelerated weathering test for 10,000 hours was carried out by using a sunshine weather meter (300 Sunshine weather meter, manufactured by Suga Test Instruments Co., Ltd.) equipped with a carbon arc lamp in accordance with JIS K7350-4: 2008. The accelerated weathering test was carried out in each of the top exposure where light entered from the light reflection layer or protective layer side and water was sprayed to the light reflection layer or protective layer side, and the back exposure where light entered from the substrate side and water was sprayed to the substrate side. After the accelerated weathering test, the adhesion of the light reflection layer was evaluated, and the solar reflectance of the laminate was measured. The solar reflectance was measured by applying light from the substrate side in each of the top exposure and the back exposure. The solar reflectance retention (=solar reflectance after test/solar reflectance before test×100) was obtained. The solar reflectance retention was regarded as "poor" when it was less than 70%, "acceptable" when it was at least 70% and "good" when it was at least 80%.

[Aluminum Pigment]

As an aluminum pigment, an aluminum paste containing a liquid medium was used. Tradename and solid content of the aluminum paste, type of coating of the aluminum pigment, a coating amount to 100 parts by mass of aluminum particles, and water surface diffusion area are shown in Table 1. All of the aluminum pastes are manufactured by Toyo Aluminum K.K.

stirring, whereby a silver paste was obtained. A mixed solvent of toluene/MEK=50/50 (mass ratio) (amount shown in lower row) was added to the silver paste, whereby a coating fluid for forming a light reflection layer having a Zahn cup No.3 viscosity of 25 seconds was obtained.

Here, the coating fluid for forming a light reflection layer is referred to as a first coating fluid.

In Ex. 3 to 7, 9 to 13 and 15, 120 g (solid content: 72 g) of a solution of the copolymer (A) (Lumiflon (registered trademark) LF200MEK, manufactured by Asahi Glass Company, Limited, solid content: 60 mass %, solvent: MEK) and 8 g (solid content: 7.2 g) of an isocyanate curing agent (coronate (registered trademark) 2096, manufactured by TOSOH CORPORATION, solid content: 90 mass %), were mixed, and 120 g of a mixed solvent of toluene/MEK=50/50 (mass ratio) was added thereto, whereby a second coating fluid having a Zahn cup No.3 viscosity of 20 seconds was obtained. The proportion of the isocyanate curing agent to 100 parts by mass of the copolymer (B2) is 10.0 parts by mass.

In Ex.2, 110 g of the above mixed solvent was added to 120 g (solid content: 72 g) of a solution of the copolymer (A), whereby a coating fluid for forming a protective layer having a Zahn cup No.3 viscosity of 20 seconds was obtained.

Here, the coating fluid for forming a protective layer is referred to as a second coating fluid.

In the case of forming no protective layer, the surface of an ETFE film subjected to corona discharge treatment was

TABLE 1

| Aluminum paste | (1) | (2) | (3) | (4) | (5) | (6) |
|---|---|---|---|---|---|---|
| Tradename | BPA280PA | BPA280PA | BPZ6370 | WZA7670 | BPA6390 | EMR-B5680 |
| Solid content of aluminum pigment (mass %) | 55.4 | 49.8 | 50.0 | 47.0 | 55.0 | 45.0 |
| Type of coating | Crosslinked acrylic resin | Crosslinked acrylic resin | Crosslinked acrylic resin | Silica | Crosslinked acrylic resin | Silica |
| Coating amount to 100 parts by mass of aluminum particles (part by mass) | 4 | 12 | 25 | 10 | 6 | 6 |
| Water surface diffusion area (cm$^2$/g) | 21,000 | 18,000 | 14,500 | 14,000 | 22,000 | 21,000 |

Ex. 1 to 13

ETFE (Fluon (registered trademark) ETFE 55AXP, manufactured by Asahi Glass Company, Limited) was formed into a film to obtain an ETFE film having a thickness of 250 μm. The total luminous transmittance of the ETFE film was 92%, and the stress at 10% elongation at 23° C. was 22 MPa.

The surface of the ETFE film was subjected to corona discharge treatment in air at a treatment density of 150 W·min/m$^2$. The surface tension of the surface subjected to the corona discharge treatment was 0.054 N/m.

A solution of the copolymer (A) (Lumiflon (registered trademark) LF200MEK, manufactured by Asahi Glass Company, Limited, solid content: 60 mass %, solvent: methyl ethyl ketone (hereinafter referred to also as "MEK")), an aluminum paste and a mixed solvent of toluene/MEK=50/50 (mass ratio) (amount described in upper row) were mixed in a proportion shown in Table 2 or Table 3, followed by coated with the first coating fluid by gravure printing, so that the light reflection layer after drying would have a thickness shown in Table 2 or Table 3, and that the ratio of the area of the light reflection layer to the area of the substrate would be 50%, followed by drying at 100° C. for 20 seconds, whereby a laminate having the light reflection layer formed on the substrate was obtained. The thickness of the light reflection layer was adjusted depending on the depth of the concave portion of a gravure plate. The evaluation result of the laminate is shown in Table 2 and Table 3.

In the case of forming a protective layer, the surface of an ETFE film subjected to corona discharge treatment was coated with the first coating fluid by gravure printing, so that the light reflection layer after drying would have a thickness shown in Table 2 or Table 3, and that the ratio of the area of the light reflection layer to the area of the substrate would be 100%, followed by drying at 80° C. for 2 seconds, and the resulting surface was coated with the second coating fluid by gravure printing, so that the protective layer after drying would have a thickness shown in Table 2 or Table 3, and that the ratio of the area of the protective layer to the area of the substrate would be 100%, followed by drying at 100° C. for 20 seconds, whereby a laminate having the light reflection layer and the protective layer formed on the substrate was obtained. The light reflection layer and the protective layer were adjusted depending on the depth of a concave portion of a gravure plate. The evaluation result of the laminate is shown in Table 2 and Table 3.

Ex. 14 and 15

The first coating fluid was obtained by blending a solution of THV (a MEK solution of THV221 (manufactured by 3M Company), solid content: 20 mass %), an aluminum paste (4), 3-aminopropyltriethoxysilane and MEK in a mass ratio of 100:20:1:100. 3-aminopropyltriethoxysilane is an agent for improving adhesion to the substrate or the protective layer. The proportion in the light reflection layer is an aluminum pigment/THV/3-aminopropyltriethoxysilane=27.6/69.0/3.4 (mass %).

The laminate in Ex. 14 or Ex. 15 was obtained in the same manner as in Ex. 1 or Ex. 5, except that the first coating fluid was changed to the above one. The evaluation result of the laminate is shown in Table 3.

TABLE 2

| | Ex. | | 1 | 2 | 3 | 4 | 5 | 6 | 7 |
|---|---|---|---|---|---|---|---|---|---|
| First coating fluid | Aluminum paste | Type | (4) | (4) | (4) | (4) | (4) | (4) | (4) |
| | | Blend amount (g) | 28.5 | 28.5 | 28.5 | 28.5 | 28.5 | 28.5 | 28.5 |
| | Copolymer solution | Type of copolymer | (A) | (A) | (A) | (A) | (A) | (A) | (A) |
| | | Blend amount of solution (g) | 63.7 | 63.7 | 63.7 | 63.7 | 63.7 | 63.7 | 63.7 |
| | Mixed solvent | For mixing and stirring (g) | 7.8 | 7.8 | 7.8 | 7.8 | 7.8 | 7.8 | 7.8 |
| | | For adding (g) | 60 | 60 | 60 | 60 | 60 | 60 | 60 |
| Light reflection layer | Proportion of aluminum particles (mass %) | | 23.6 | 23.6 | 23.6 | 23.6 | 23.6 | 23.6 | 23.6 |
| | Proportion of aluminum pigment (mass %) | | 26.0 | 26.0 | 26.0 | 26.0 | 26.0 | 26.0 | 26.0 |
| | Thickness (μm) | | 3 | 3 | 3 | 3 | 3 | 3 | 5 |
| Second coating fluid | Copolymer solution | Type of copolymer | — | (A) | (A) | (A) | (A) | (A) | (A) |
| | Proportion of isocyanate curing agent (parts by mass)/100 parts by mass of copolymer | | — | 0 | 10.0 | 10.0 | 10.0 | 10.0 | 10.0 |
| Protective layer | Thickness (μm) | | Nil | 2.0 | 0.3 | 1.0 | 2.0 | 3.0 | 2.0 |
| | Initial adhesion of light reflection layer | | A | A | A | A | A | A | A |
| | Initial solar reflectance (%) | | 52.8 | 53.1 | 53.3 | 52.3 | 53.3 | 53.8 | 80.9 |
| 80° C. hot bath steam condensation test | Solar reflectance retention (%) | | 34 | 70 | 82 | 89 | 90 | 90 | 88 |
| Top exposure accelerated weathering test | Solar reflectance retention (%) | | 66 | 65 | 86 | 87 | 87 | 86 | 86 |
| | Adhesion of light reflection layer | | A | A | A | A | A | A | A |
| Back exposure accelerated weathering test | Solar reflectance retention (%) | | 88 | 88 | 84 | 84 | 84 | 85 | 86 |
| | Adhesion of light reflection layer | | A | A | A | A | A | C | A |

TABLE 3

| | Ex. | | 8 | 9 | 10 | 11 | 12 | 13 | 14 | 15 |
|---|---|---|---|---|---|---|---|---|---|---|
| First coating fluid | Aluminum paste | Type | (1) | (1) | (2) | (3) | (5) | (6) | (4) | (4) |
| | | Blend amount (g) | 28.5 | 28.5 | 28.5 | 25.9 | 28.5 | 28.5 | 28.5 | 28.5 |
| | Copolymer solution | Type of copolymer | (A) | (A) | (A) | (A) | (A) | (A) | THV | THV |
| | | Blend amount of solution (g) | 63.7 | 63.7 | 63.7 | 67.0 | 63.7 | 63.7 | 167.6 | 167.6 |
| | Mixed solvent | For mixing and stirring (g) | 7.8 | 7.8 | 7.8 | 7.1 | 7.8 | 7.8 | — | — |
| | | For adding (g) | 60 | 60 | 60 | 60 | 60 | 60 | 167.6 | 167.6 |
| Light reflection layer | Proportion of aluminum particles (mass %) | | 28.1 | 28.1 | 24.2 | 19.5 | 27.4 | 23.7 | 25.1 | 25.1 |
| | Proportion of aluminum pigment (mass %) | | 29.2 | 29.2 | 27.1 | 24.4 | 29.0 | 25.1 | 27.6 | 27.6 |
| | Thickness (μm) | | 3 | 3 | 3 | 3 | 3 | 3 | 3 | 3 |
| Second coating fluid | Copolymer solution | Type of copolymer | — | (A) | (A) | (A) | (A) | (A) | — | (A) |
| | Proportion of isocyanate curing agent (parts by mass)/100 parts by mass of copolymer | | — | 10.0 | 10.0 | 10.0 | 10.0 | 10.0 | — | 10.0 |
| Protective layer | Thickness (μm) | | Nil | 2.0 | 2.0 | 2.0 | 2.0 | 2.0 | Nil | 2.0 |
| | Initial adhesion of light reflection layer | | A | A | A | A | A | A | A | A |
| | Initial solar reflectance (%) | | 66.5 | 65.9 | 61.5 | 52.3 | 65.3 | 61.7 | 52.3 | 52.0 |
| 80° C. hot bath steam condensation test | Solar reflectance retention (%) | | 22 | 93 | 95 | 100 | 96 | 96 | 29 | 88 |
| Top exposure accelerated weathering test | Solar reflectance retention (%) | | 61 | 85 | 85 | 74 | 84 | 82 | 20 | 83 |
| | Adhesion of light reflection layer | | A | A | A | A | A | A | A | A |

TABLE 3-continued

| | Ex. | 8 | 9 | 10 | 11 | 12 | 13 | 14 | 15 |
|---|---|---|---|---|---|---|---|---|---|
| Back exposure accelerated weathering test | Solar reflectance retention (%) | 78 | 89 | 84 | 70 | 81 | 85 | 81 | 83 |
| | Adhesion of light reflection layer | A | A | A | A | A | A | A | A |

Ex. 1 is an example in which no protective layer is formed. The solar reflectance retention was low in each of the 80° C. hot bath steam condensation test and the accelerated weathering test in top exposure.

Ex. 2 is an example in which a protective layer is made of a resin composition containing no curing agent. The solar reflectance retention in the 80° C. hot bath steam condensation test was good as compared with Ex. 1, but the solar reflectance retention in the accelerated weathering test in top exposure was low as in Ex. 1.

Ex. 3 to 5 are examples in which a protective layer is made of a cured product of a curable resin composition, and the thickness of the protective layer is from 0.3 to 2 μm. In all of the test, the solar reflectance retention was good, and delamination of the light reflection layer was suppressed.

Ex. 6 is an example in which the thickness of the protective layer is 3 μm. In the accelerated weathering test in back exposure, delamination of the light reflection layer was remarkable.

Ex. 7 is an example in which the thickness of the light reflection layer in Ex. 5 was changed from 3 μm to 5 μm. In all of the tests, the solar reflectance retention was good, and delamination of the light reflection layer was suppressed. The initial solar reflectance was high as compared with Ex. 5.

Ex. 8 is an example in which the type of the aluminum pigment in Ex. 1 was changed. Even when the type of the aluminum pigment was changed, the solar reflectance retention in each of the 80° C. hot bath steam condensation test and the accelerated weathering test in top exposure was low.

Ex. 9 to 13 are examples in which the type of the aluminum pigment in Ex. 5 was changed. In all of the tests, the solar reflectance retention was good and delamination of the light reflection layer was suppressed, even when the type of the aluminum pigment was changed. Further, in Ex. 11, the coating amount of the acrylic resin in the aluminum pigment was too large, and therefore the solar reflectance retention in the accelerated weathering test in each of top exposure and back exposure was somewhat low.

In Ex. 14, the second fluorinated polymer in Ex. 1 was changed from the copolymer (A) to THV. Even when the type of the second fluorinated polymer was changed, the solar reflectance retention in each of the 80° C. hot bath steam condensation test and the accelerated weathering test in top exposure was low.

Ex. 15 is an example in which the second fluorinated polymer in Ex. 5 was changed from the copolymer (A) to THV. In all of the test, the solar reflectance retention was good and delamination of the light reflection layer was suppressed, even when the type of the second fluorinated polymer was changed.

INDUSTRIAL APPLICABILITY

The laminate of the present invention is useful as a film material (such as a roofing material, an exterior wall material, a skylight, a waterproof sheet or a building curing sheet) for film structure buildings (such as sports facilities (such as a swimming pool, a gymnasium, a tennis court, a football ground and an athletics stadium), warehouses, halls, exhibition halls, horticultural facilities (such as a horticultural greenhouse and an agricultural greenhouse) and arcades). It is particularly useful as a film material for a film structure building in which solar radiation is received by the film.

REFERENCE SYMBOLS

1: laminate, 10: substrate, 12: light reflection layer, 14: protective layer, L: solar light

What is claimed is:
1. A laminate comprising:
    a substrate comprising a first fluorinated polymer;
    a light reflection layer made of a non-curable resin composition comprising a second fluorinated polymer and an aluminum pigment; and
    a protective layer obtained by curing a curable resin composition comprising a third fluorinated polymer having a crosslinkable group and a curing agent for curing the third fluorinated polymer,
    wherein the light reflection layer is disposed between the substrate and the protective layer, the light reflection layer has a thickness of from 0.5 to 5 μm, and the protective layer has a thickness of from 0.3 to 2 μm.
2. The laminate according to claim 1, wherein the first fluorinated polymer is a vinyl fluoride polymer, a vinylidene fluoride polymer, a vinylidene fluoride-hexafluoropropylene copolymer, a tetrafluoroethylene-hexafluoropropylene-vinylidene fluoride copolymer, a tetrafluoroethylene-propylene copolymer, a tetrafluoroethylene-vinylidene fluoride-propylene copolymer, an ethylene-tetrafluoroethylene copolymer, a hexafluoropropylene-tetrafluoroethylene copolymer, an ethylene-hexafluoropropylene-tetrafluoroethylene copolymer, a perfluoro(alkyl vinyl ether)-tetrafluoroethylene copolymer, a chlorotrifluoroethylene polymer or an ethylene-chlorotrifluoroethylene copolymer.
3. The laminate according to claim 1, wherein the first fluorinated polymer is an ethylene-tetrafluoroethylene copolymer.
4. The laminate according to claim 1, wherein the surface of the substrate on the side being in contact with the light reflection layer, is subjected to corona discharge treatment.
5. The laminate according to claim 1, wherein the second fluorinated polymer is a copolymer having a tetrafluoroethylene unit, a hexafluoropropylene unit and a vinylidene fluoride unit, or a copolymer having a fluoroolefin unit and a monomer unit having a hydroxy group.
6. The laminate according to claim 5, wherein the second fluorinated polymer is the copolymer having a fluoroolefin unit and a monomer unit having a hydroxy group, and the non-curable resin composition contains no curing agent for curing the copolymer.
7. The laminate according to claim 5, wherein the second fluorinated polymer is a copolymer of:
    a fluoroolefin which is tetrafluoroethylene or chlorotrifluoroethylene;

a monomer having a hydroxy group which is a hydroxyalkyl vinyl ether; and at least one monomer selected from the group consisting of a cycloalkyl vinyl ether, an alkyl vinyl ether and a carboxylic acid vinyl ester.

8. The laminate according to claim 1, wherein the aluminum pigment is made of a composite which is an aluminum particle having a part or whole of surface thereof coated with at least one member selected from the group consisting of an acrylic resin and silica, wherein the total coating amount of the acrylic resin and silica is from 3 to 15 parts by mass per 100 parts by mass of the aluminum particles.

9. The laminate according to claim 1, wherein the crosslinkable group in the third fluorinated polymer is a hydroxy group, a carboxy group, an amide group or a glycidyl group.

10. The laminate according to claim 1, wherein the third fluorinated polymer is a copolymer comprising a fluoroolefin unit and a monomer unit having a hydroxy group.

11. The laminate according to claim 10, wherein the copolymer is a copolymer of:

tetrafluoroethylene or chlorotrifluoroethylene;

a hydroxyalkyl vinyl ether; and at least one monomer selected from the group consisting of a cycloalkyl vinyl ether, an alkyl vinyl ether and a carboxylic acid vinyl ester.

12. The laminate according to claim 1, wherein the curing agent is at least one member selected from the group consisting of an isocyanate curing agent, a blocked isocyanate curing agent and an aminoplast curing agent.

13. The laminate according to claim 1, which is a film material for a film structure building.

14. The laminate according to claim 13, wherein the film structure building is a building in which solar radiation is received by the film.

15. A process for producing the laminate as defined in claim 1, comprising;

coating at least a part of the surface of the substrate with a coating fluid comprising the non-curable resin composition and a solvent, drying the coated substrate to form the light reflection layer; and coating at least the surface of the light reflection layer with a coating fluid comprising the curable resin composition and a solvent; and drying and thereby curing the curable resin composition to form the protective layer.

* * * * *